US012794147B2

(12) United States Patent
Peters et al.

(10) Patent No.: US 12,794,147 B2
(45) Date of Patent: Nov. 10, 2026

(54) LOW-PROFILE MULTI-ANTENNA ASSEMBLY

(71) Applicant: TAOGLAS GROUP HOLDINGS LIMITED, Enniscorthy (IE)

(72) Inventors: Steven Gregory Peters, Minneapolis, MN (US); Gregory Jay Samson, Minneapolis, MN (US); Patrick Carl Frank, Minneapolis, MN (US)

(73) Assignee: Taoglas Group Holdings Limited, Enniscorthy (IE)

( * ) Notice: Subject to any disclaimer, the term of this patent is extended or adjusted under 35 U.S.C. 154(b) by 0 days.

(21) Appl. No.: 19/204,896

(22) Filed: May 12, 2025

(65) Prior Publication Data

US 2025/0364730 A1 Nov. 27, 2025

Related U.S. Application Data

(60) Provisional application No. 63/650,028, filed on May 21, 2024.

(51) Int. Cl.

| | |
|---|---|
| ***H01Q 21/20*** | (2006.01) |
| ***H01Q 1/22*** | (2006.01) |
| ***H01Q 1/42*** | (2006.01) |
| ***H01Q 1/48*** | (2006.01) |
| ***H01Q 7/00*** | (2006.01) |
| ***H01Q 9/04*** | (2006.01) |
| ***H01Q 9/16*** | (2006.01) |

(52) U.S. Cl.
CPC ........... *H01Q 21/20* (2013.01); *H01Q 1/2291* (2013.01); *H01Q 1/42* (2013.01); *H01Q 1/48* (2013.01); *H01Q 7/00* (2013.01); *H01Q 9/0421* (2013.01); *H01Q 9/16* (2013.01)

(58) Field of Classification Search
CPC ........ H01Q 21/20; H01Q 1/2291; H01Q 1/42; H01Q 1/48; H01Q 7/00; H01Q 9/0421; H01Q 9/16
See application file for complete search history.

(56) References Cited

U.S. PATENT DOCUMENTS

2024/0113450 A1* 4/2024 Neenan .................... H01Q 1/48
2024/0304985 A1* 9/2024 Ng ......................... H01Q 5/371

* cited by examiner

*Primary Examiner* — Dieu Hien T Duong
(74) *Attorney, Agent, or Firm* — Garson & Gutierrez, PC

(57) ABSTRACT

Low-profile multi-antenna assembly. In one embodiment, the multi-antenna assembly includes UHF antenna elements and a wire loop antenna element that are each coupled to a multi-antenna printed circuit board ("PCB"). A portion of the UHF antenna elements and the wire loop antenna element are arranged to be coplanar with one another. The multi-antenna assembly also includes cellular antenna elements and one or more Wi-Fi antenna elements that are disposed on the multi-antenna PCB. A radiating portion of the cellular antenna elements and the one or more Wi-Fi antenna elements are arranged in parallel with the UHF antenna elements and the wire loop antenna element. A portion of the cellular antenna elements and the one or more Wi-Fi antenna elements are arranged on the multi-antenna PCB such that they do not overlap with feed portions of the UHF antenna elements. Methods of manufacturing and installing the multi-antenna assembly are also disclosed.

20 Claims, 11 Drawing Sheets

LOW-PROFILE MULTI-ANTENNA ASSEMBLY

CROSS-REFERENCE TO RELATED APPLICATIONS

This application claims the benefit of priority to U.S. Provisional Patent Application Ser. No. 63/650,028 filed May 21, 2024, of the same title, the contents of which being incorporated herein by reference in its entirety.

FIELD

The present disclosure relates generally to multi-antenna assemblies, and more particularly in one exemplary aspect to low-profile multi-antenna assemblies.

BACKGROUND

Traditionally, antennas for use with, for example, recreational vehicles ("RVs") have been limited in the types of radio-frequency bands they offered as well as limitations in the form factors for these antennas that are available. For example, many RV antenna designs are constrained to operate within the very high-frequency (VHF) and ultra-high frequency (UHF) radio frequencies which enable over the air television broadcast reception. More recently, RV antenna manufacturers have implemented multi-antenna designs which offer the ability to receive frequency-modulation (FM) radio signals as well as transmit and/or receive 4th generation long term evolution (LTE) and WiFi radio signals. However, these prior multi-antenna assemblies were relatively large due to the physical size constraints of the antenna design, dependent upon the frequency band of interest, as well as the physical spacing requirements needed to maintain adequate isolation between these different types of antennas. Accordingly, new techniques are needed which enable multi-antenna operation within more aesthetically appealing form factors.

SUMMARY

The present disclosure satisfies the foregoing needs by providing, inter alia, methods, apparatus and systems for the implementation of multi-antenna assemblies in more desirable form factors.

In one aspect, a multi-antenna assembly is disclosed. In one embodiment, the multi-antenna assembly includes a plurality of ultra-high frequency (UHF) antenna elements and a wire loop antenna element that are each coupled to a multi-antenna printed circuit board (PCB), portions of the plurality of UHF antenna elements and a portion of the wire loop antenna element being arranged coplanar with one another; and a plurality of cellular antenna elements and one or more Wi-Fi antenna elements disposed on the multi-antenna PCB, a radiating portion of the plurality of cellular antenna elements and the one or more Wi-Fi antenna elements being arranged parallel and offset with the plurality of UHF antenna elements and the wire loop antenna element. A portion of the plurality of cellular antenna elements and a portion of the one or more Wi-Fi antenna elements are arranged on the multi-antenna PCB such that they do not overlap with feed portions of the plurality of UHF antenna elements.

In a variant, each of the plurality of UHF antenna elements include dipole antenna elements.

In another variant, the plurality of UHF antenna elements collectively includes a circular array of dipole antenna elements.

In yet another variant, each of the plurality of UHF antenna elements includes a stamped metal element.

In yet another variant, each of the plurality of UHF antenna elements are heat-staked to a polymer housing.

In yet another variant, the feed portions of the plurality of UHF antenna elements and ends of the wire loop antenna element are received within the multi-antenna PCB.

In yet another variant, the multi-antenna PCB includes a generally hexagonal ground plane.

In yet another variant, each side of the generally hexagonal ground plane has a cellular antenna element of the plurality of cellular antenna elements or one of the one or more Wi-Fi antenna elements associated with a respective side of the generally hexagonal ground plane.

In yet another variant, the feed portions of the plurality of UHF antenna elements only pass over half of the plurality of cellular antenna elements.

In yet another variant, the feed portions of the plurality of UHF antenna elements only pass over half of the one or more Wi-Fi antenna elements.

In yet another variant, the generally hexagonal ground plane further includes a global navigation satellite system (GNSS) antenna element.

In yet another variant, the multi-antenna assembly also includes a polymer housing having a mounting surface. The plurality of UHF antenna elements, the wire loop antenna element and the multi-antenna PCB are each positioned in a top half of the polymer housing that is disposed furthest away from the mounting surface of the housing.

In yet another variant, the mounting surface of the housing comprises a curved surface.

In yet another variant, the polymer housing further includes a plurality of bosses, the plurality of bosses being configured to collectively support the plurality of UHF antenna elements, the wire loop antenna element and the multi-antenna PCB.

In yet another variant, each of the plurality of UHF antenna elements are heat-staked to the polymer housing.

In yet another variant, the plurality of cellular antenna elements and the one or more Wi-Fi antenna elements each include an inverted-F antenna (IFA) element.

In another aspect, methods of manufacturing and installing the multi-antenna assembly are also disclosed.

Other features and advantages of the present disclosure will immediately be recognized by persons of ordinary skill in the art with reference to the attached drawings and detailed description of exemplary implementations as given below.

BRIEF DESCRIPTION OF DRAWINGS

The features, objectives, and advantages of the present disclosure will become more apparent from the detailed description set forth below when taken in conjunction with the drawings, wherein.

All Figures disclosed herein are @ Copyright 2024 Taoglas Group Holdings Limited. All rights reserved.

DESCRIPTION

Detailed descriptions of the various embodiments and variants of the apparatus and methods of the present disclosure are now provided. It is noted that wherever practicable similar or like reference numbers may be used in the figures and may indicate similar or like functionality. The figures depict embodiments of a multi-antenna assembly as well as exemplary methods of installation of this multi-antenna assembly for purposes of illustration only. One skilled in the art will readily recognize from the following description that alternative embodiments of the structures and methods illustrated may be employed without necessarily departing from the principles described herein.

Exemplary Multi-Antenna Assembly—

Figure 1A:
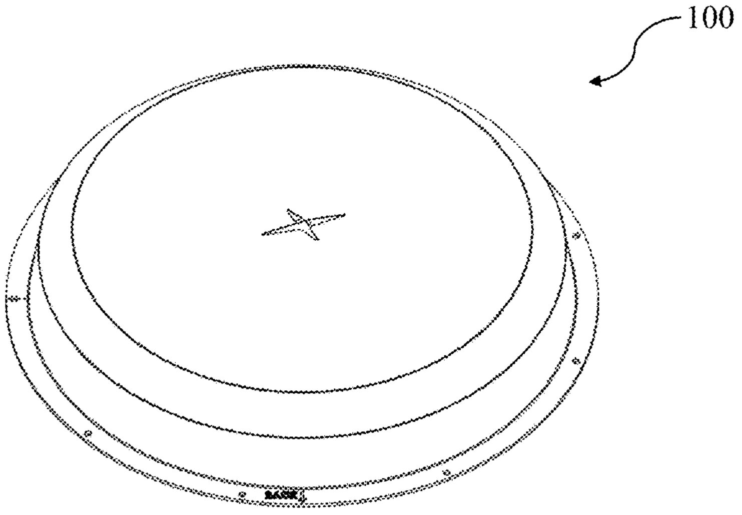
FIG. 1A is a top perspective view of a first multi-antenna assembly, in accordance with the principles of the present disclosure.

Referring now to FIG. 1A, a top perspective view of a multi-antenna assembly 100 is illustrated. The multi-antenna assembly 100 may include multiple antenna elements enabling the multi-antenna assembly 100 to operate in cellular frequency bands (including 2G/3G/4G/5G), Wi-Fi frequency bands, global navigation satellite system ("GNSS") frequency bands, television frequency bands (including UHF and VHF), as well as radio frequencies such as FM. The multi-antenna assembly 100 may also include electronic components which enable filtering, amplification, and other signal conditioning functionality for various ones of the antenna elements. In some implementations, the multi-antenna assembly 100 may be assembled onto vehicles such as, for example, RVs, though the multi-antenna assembly 100 may be utilized in applications outside of vehicles.

Figure 1B:
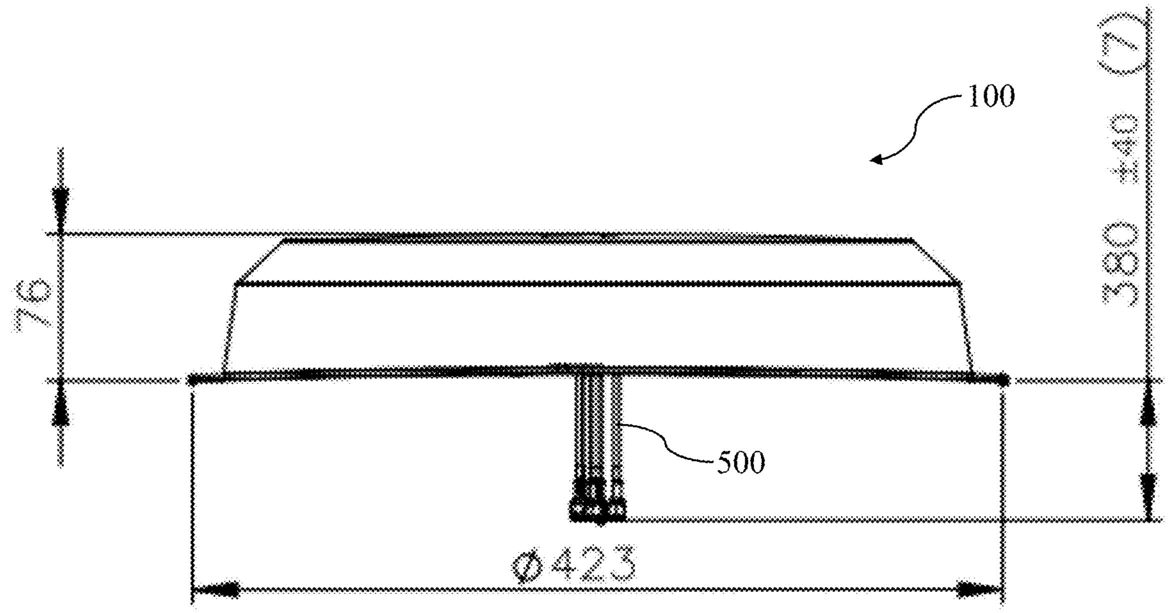
FIG. 1B is a front elevation view of the multi-antenna assembly of FIG. 1A, in accordance with the principles of the present disclosure.

Referring now to FIG. 1B, a front elevation view of an embodiment of the multi-antenna assembly 100 is shown. The multi-antenna assembly 100 includes a plurality of coaxial cables 500 which couple the antenna elements within the multi-antenna assembly 100 to external equipment such as, for example, television receivers, cellular equipment, radio receivers as well as other types of radio equipment. The multi-antenna assembly 100 may have an overall height of 76 mm, and an overall diameter of 423 mm although it would be appreciated that these dimensions may vary dependent upon, for example, the specific types of antenna elements included within the multi-antenna assembly 100.

Figure 1C:
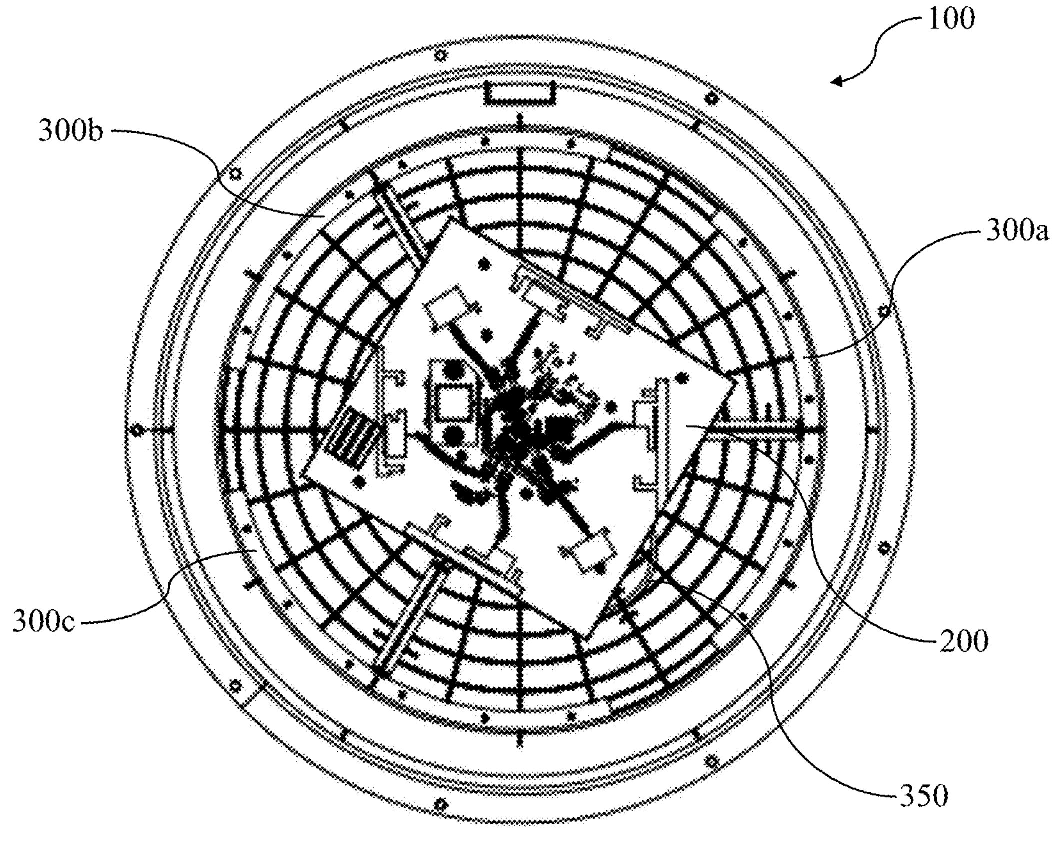
FIG. 1C is a bottom plan view of the multi-antenna assembly of FIG. 1A, in accordance with the principles of the present disclosure.
Figure 1D:
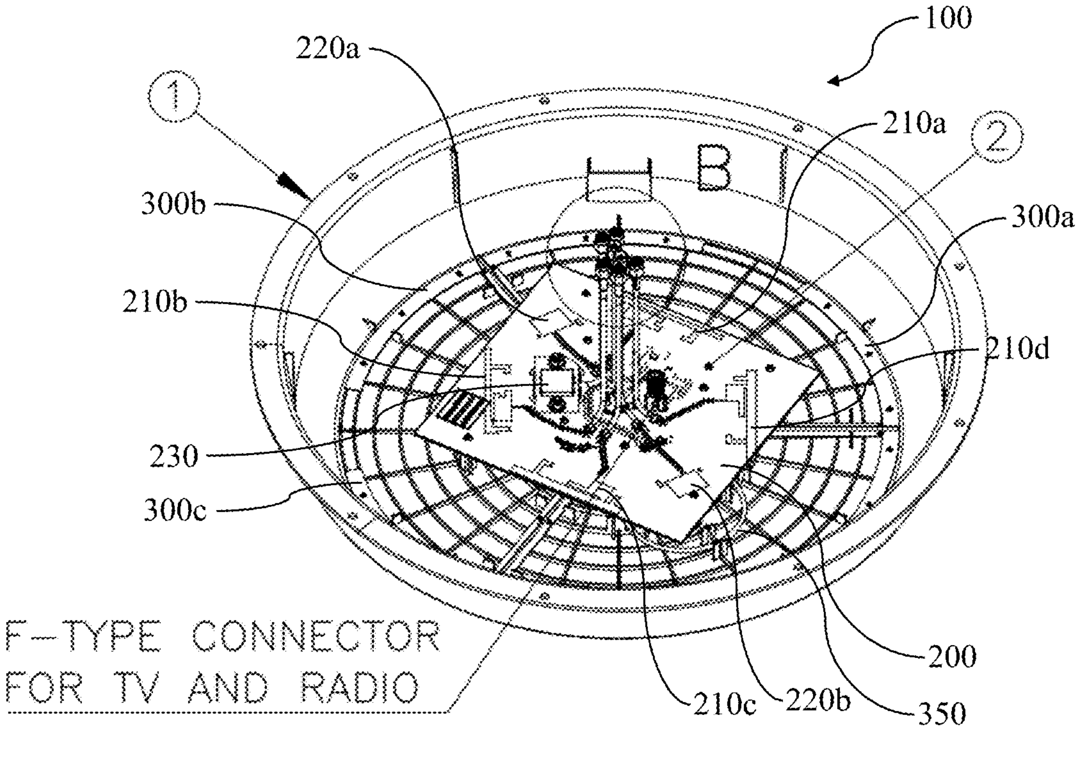
FIG. 1D is a bottom perspective view of the multi-antenna assembly of FIG. 1A, in accordance with the principles of the present disclosure.
Figure 1E:
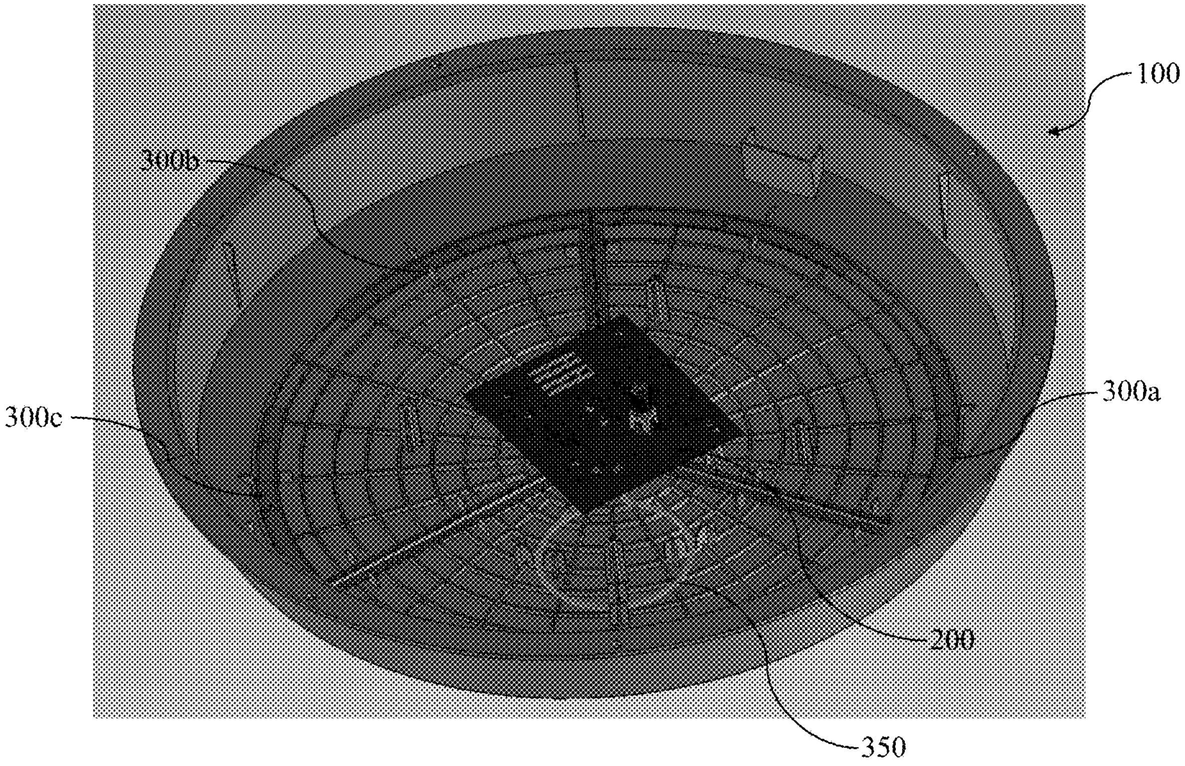
FIG. 1E is a bottom perspective view of the multi-antenna assembly of FIG. 1A with the RF cabling removed from view, in accordance with the principles of the present disclosure.

As shown in FIGS. 1C-1E, the multi-antenna assembly 100 includes three (3) UHF dipole antenna elements 300*a*, 300*b*, 300*c*. Each of these UHF dipole elements are 120° offset from one another. The multi-antenna assembly 100 may also include a wire loop antenna element 350 which may be used for FM and VHF radio frequency reception. The multi-antenna assembly 100 may also include a PCB assembly 200 which may include cellular (e.g., LTE) antenna elements 210*a*, 210*b*, 210*c*, 210*d*, Wi-Fi antenna elements 220*a*, 220*b* as well as a GNSS antenna element 230. The cellular antenna elements 210 and Wi-Fi antenna elements 220 may be constructed as inverted-F antenna (IFA) elements. The UHF dipole elements 300 (or portions thereof) may be positioned coplanar with the wire loop antenna element 350, while also being positioned parallel and offset from the PCB assembly (see also FIG. 1F). The antenna elements may be mounted as far up in the housing of the multi-antenna assembly 100 as possible to maintain physical distance between the antenna elements and the mounting surface for the multi-antenna assembly 100 end application. For example, the antenna elements may be positioned entirely within the top half of the housing.

As shown in FIG. 1D, the antenna elements are spaced apart from one another to optimize the collective performance for each of the antenna elements. For example, a first Wi-Fi antenna element 220*a* is positioned over one of the UHF dipole antenna elements 300*b*. The second Wi-Fi antenna element 220*b* (as well as the wire loop antenna element 350) is positioned between the other two UHF dipole antenna elements 300*a*, 300*c*. A first cellular antenna element 210*a* may be positioned between the UHF dipole antenna elements 300*a*, 300*b*. A second cellular antenna element 210*b* may be positioned between UHF dipole antenna elements 300*b*, 300*c*. A third cellular antenna element 210*c* may be positioned over UHF dipole antenna element 300*c*, while a fourth cellular antenna element 210*d* may be positioned over UHF dipole antenna element 300*a*. The GNSS patch antenna element 230 may be positioned between UHF dipole antenna elements 300*b*, 300*c*. One or more of these antenna elements may be obviated in some implementations. For example, one variant may only include the UHF dipole antenna elements 300 and the wire loop antenna element 350. Another variant may only include the UHF dipole antenna elements 300, the wire loop antenna element 350, two cellular antenna elements 210 and a single Wi-Fi antenna element 220. In some implementations, a GNSS patch antenna element 230 may be included in the multi-antenna assembly 100. In other implementations, additional antenna elements may be included in addition to those antenna elements shown in, for example, FIG. 1D. These and other variants would be readily apparent to one of ordinary skill given the contents of the present disclosure.

Figure 1F:
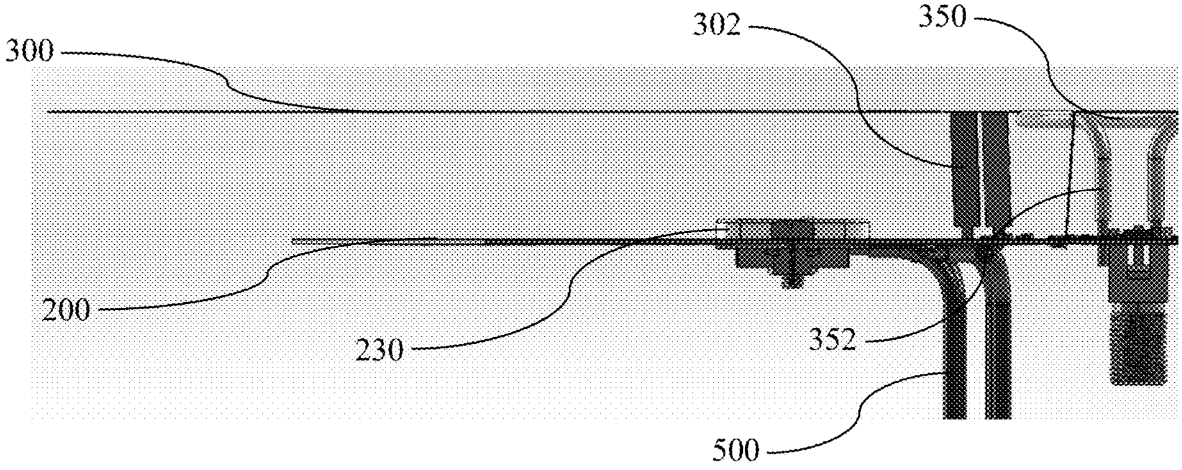
FIG. 1F is a cross-sectional view of the multi-antenna assembly of FIG. 1A illustrating the physical separation of the UHF antenna from the multi-antenna printed circuit board (PCB) of the multi-antenna assembly of FIG. 1A, in accordance with the principles of the present disclosure.

As illustrated in, for example, FIG. 1E, the UHF antenna elements 300 are formed as a circular array of dipoles. The UHF antenna elements 300 are designed for maximum radiation in-plane with individual ones of the antenna elements while also having a uniform radiation pattern in the azimuth. The UHF antenna elements 300 may be optimized for reception in the 470-620 MHz frequency band. Each of the UHF antenna elements 300 may be connected in parallel with one another and balanced. As shown in FIG. 1F, each UHF antenna element 300 may be connected to the printed circuit board 200 via, for example, metal stampings 302. These metal stampings 302 may be constructed of the same material (e.g., steel, copper, and/or other suitable conductive materials) as the UHF antenna elements 300 themselves. For example, each UHF antenna element 300 as well as the metal stampings 302 may be made from a homogenous metal and formed in the same process. The UHF antenna elements 300 may be supported by portions of the housing 102 as well. For example, injection molded bosses, clips, and/or other structures may be included on the interior surface of the housing 102 that are configured to support the UHF antenna elements 300 of the multi-antenna assembly 100. Similar to the construction of the UHF antenna elements 300, the loop antenna element 350 may include wire leads 352 that are also connected with the printed circuit board 200.

Figure 1G:
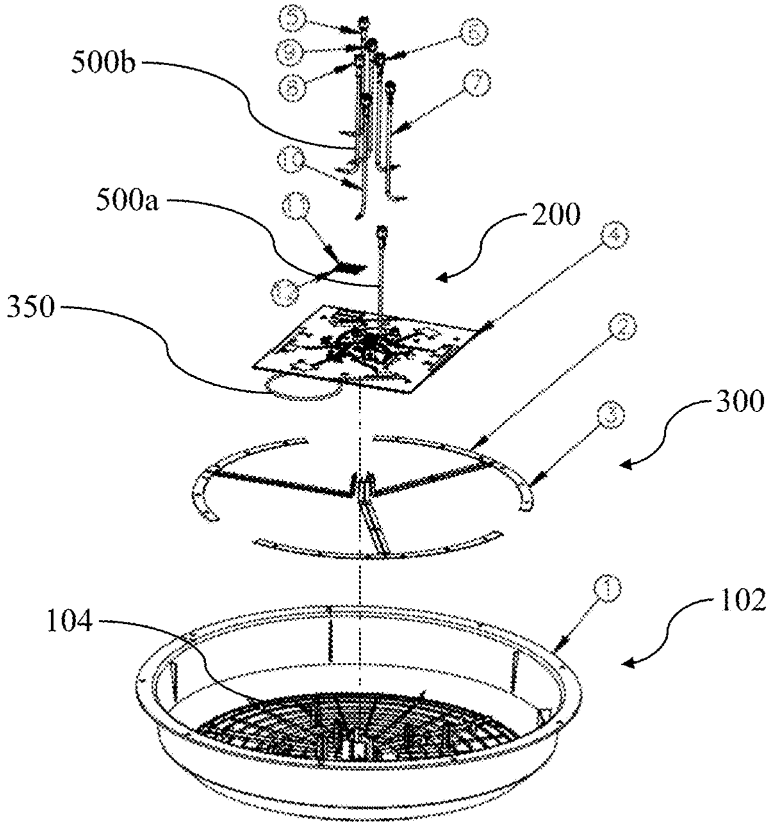
FIG. 1G is a bottom perspective exploded view of the multi-antenna assembly of FIG. 1A, in accordance with the principles of the present disclosure.

Referring now to FIG. 1G, an exploded perspective view of the multi-antenna assembly 100 is now illustrated. As can perhaps be best seen in FIG. 1G, a plurality of bosses 104 located on the interior surface of the housing 102 can be used to support the PCB assembly 200. These bosses 104 may be threaded in some implementations allowing the PCB assembly 200 to be connected to the housing 102 via, for example, screws. In addition to, or alternatively to these threaded bosses 104, these bosses 104 may be heat staked to the PCB assembly 200. These and other implementations would be readily apparent to one of ordinary skill given the contents of the present disclosure. As illustrated in FIG. 1G, the coaxial cables 500 may be of two distinct types, namely a first type of coaxial cable 500*a* may be soldered directly to the PCB assembly 200, while a second type of coaxial cable 500*b* may be connected to the PCB assembly 200 by way of a coaxial connector that is soldered and/or mechanically connected to the PCB assembly 200. These coaxial cables 500 may be secured to one another using, for example, heat shrink tubing, cable ties (e.g., zip ties) and the like. As a brief aside, by securing these coaxial cables 500 together, the collective assembly of coaxial cables 500 may act as a strain relief for the individual soldered connections of the coaxial cables 500*a*. These and other variations would be readily apparent to one of ordinary skill given the contents of the present disclosure.

Figure 2:
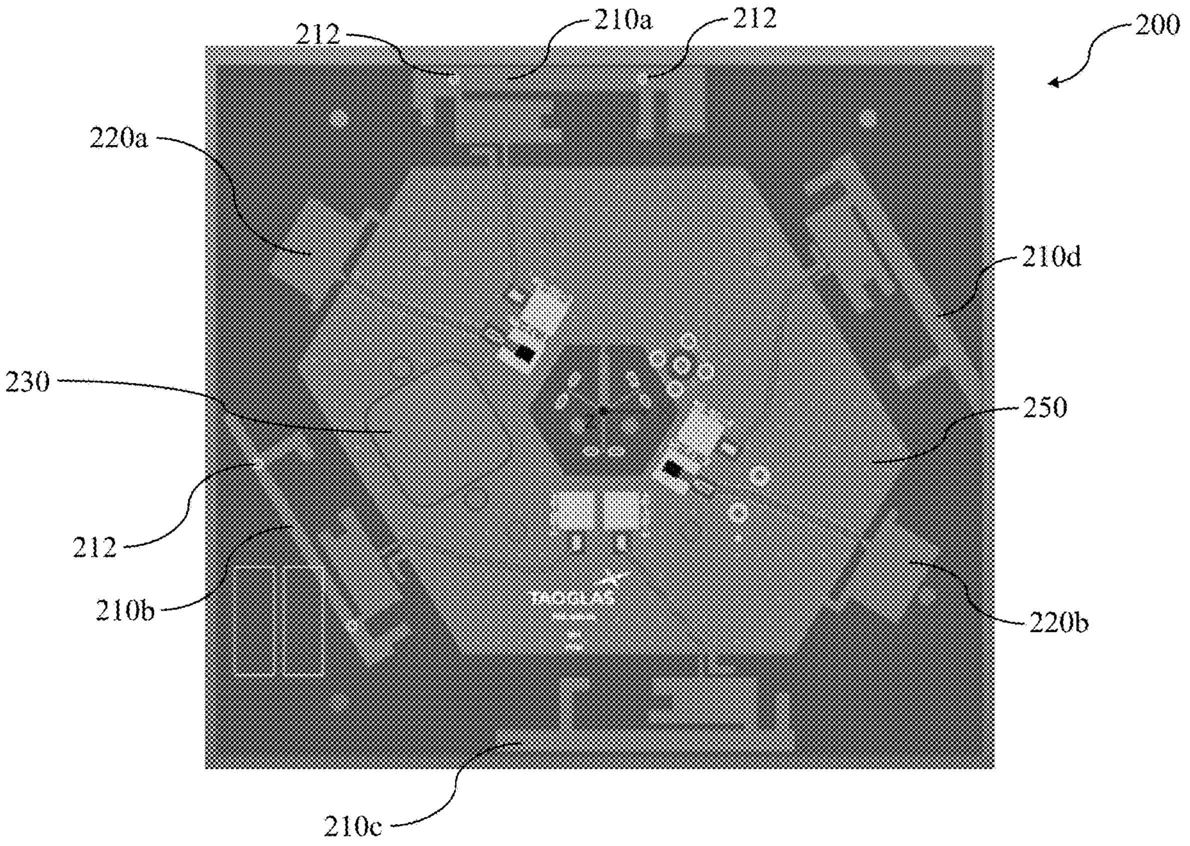
FIG. 2 is a top plan view of the multi-antenna PCB for use with the multi-antenna assembly of FIG. 1A, in accordance with the principles of the present disclosure.

Referring now to FIG. 2, a top plan view of the multi-antenna PCB assembly 200 is shown and described in detail. As previously discussed supra, the multi-antenna PCB 200 may include four (4) cellular antenna elements 210*a*, 210*b*, 210*c*, 210*d* with each of these cellular antenna elements 210 being positioned on a respective side of the generally square (or rectangular) PCB 200. The multi-antenna PCB assembly 200 may also include a first Wi-Fi antenna element 220*a* in the upper left quadrant of the multi-antenna PCB assembly 200 and a second Wi-Fi antenna element 220*b* in the lower right quadrant of the multi-antenna PCB assembly 200. The multi-antenna PCB assembly 200 may also include a GNSS antenna element 230 mounting location which may be adjacent to the second cellular antenna element 210*b*. The ground plane 250 for the multi-antenna PCB assembly 200 may be generally hexagonal in shape. This generally hexagonally shaped ground plane 250 is sized and shaped to minimize the impact on performance for the UHF antenna elements 300. This hexagonal shape may be selected so that each of the four (4) cellular antenna elements 210*a*, 210*b*, 210*c*, 210*d* and the Wi-Fi antenna elements 220*a*, 220*b* may be associated with a respective side of the hexagonal shaped ground plane. However, it would be appreciated that alternative polygonal shapes may be selected dependent on, for example, the number of cellular and Wi-Fi antenna elements selected. For example, if a total of five (5) cellular and Wi-Fi antenna elements were chosen, then the shape of the ground plane may be a pentagon. These and other alternative ground plane shapes would be readily apparent to one of ordinary skill given the contents of the present disclosure. The first cellular antenna element 210*a* and second cellular antenna element 210*b* may include through hole vias 212 which enables the inclusion of vertical conductive metal pieces (not shown, i.e., that protrude orthogonal from the underlying substrate 200) which may improve, for example, low-band LTE performance in some implementations. The first cellular antenna element 210*a* and second cellular antenna element 210*b* are also positioned on the multi-antenna PCB 200 such that they do not overlap with the UHF antenna element 300 feed arms which improves the performance of the first cellular antenna element 210*a* and second cellular antenna element 210*b* and minimizes the impact on the performance of one or more of the UHF antenna elements 300.

Figure 3:
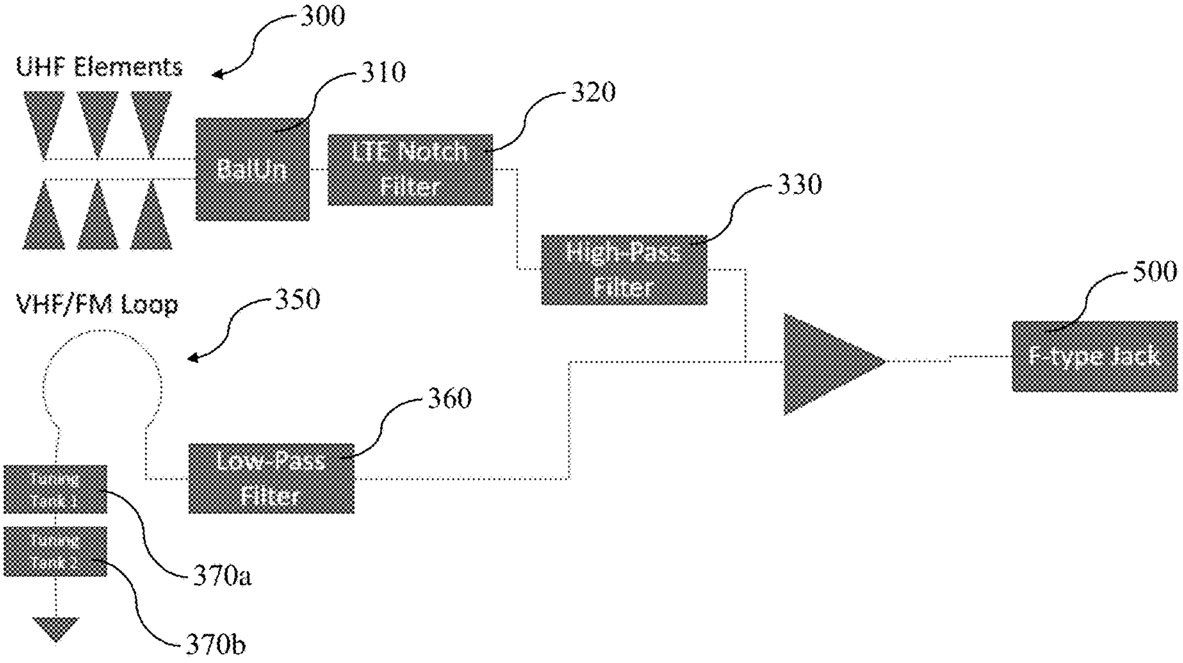
FIG. 3 is a block diagram illustrating the design of the UHF and VHF/FM antenna elements of the multi-antenna assembly of FIG. 1A, in accordance with the principles of the present disclosure.

Referring now to FIG. 3, an exemplary block diagram for the UHF/VHF/FM antenna elements 300, 350 of the multi-antenna PCB assembly 200 is shown and described in detail. Specifically, the UHF antenna elements 300 are each connected in parallel with a balun 310. A balun 310 or "balancing unit" is an electrical device that allows balanced and unbalanced lines to be interfaced without disturbing the impedance arrangement of either side of the transmission line connected to the balun 310. An LTE notch filter 320 may also be placed in the transmission line to minimize performance degradation of the UHF antenna elements 300 because of the co-located cellular antenna elements 210. A high pass filter 330 may also be placed in the transmission line which enables the passage of frequencies above a given cutoff frequency while simultaneously attenuating frequencies below the cutoff frequency. The UHF antenna elements 300 may then be coupled with a coaxial cable 500 via, for example, an F-type jack connector. The balun 310, LTE notch filter 320 and high pass filter 330 may all be incorporated on the multi-antenna PCB assembly 200. The VHF/FM loop antenna 350 may be coupled on one side to the ground plane 250 via incorporation of one or more tuning tanks 370. The other end of the VHF/FM loop antenna 350 may be coupled with a low pass filter 360 which enables the passage of frequencies below a given cutoff frequency while simultaneously attenuating frequencies above the cutoff frequency. The VHF/FM loop antenna 350 may then be coupled with a coaxial cable 500 via, for example, an F-type jack connector. In some implementations, the VHF/FM loop antenna 350 may be coupled with the same coaxial cable as the UHF antenna elements 300, though it would be readily appreciated that each antenna element 300, 350 may be coupled to distinct coaxial cables 500 in some embodiments. The one or more tuning tanks 370 and the low pass filter 360 may be incorporated onto the multi-antenna PCB assembly 200.

Figure 4A:
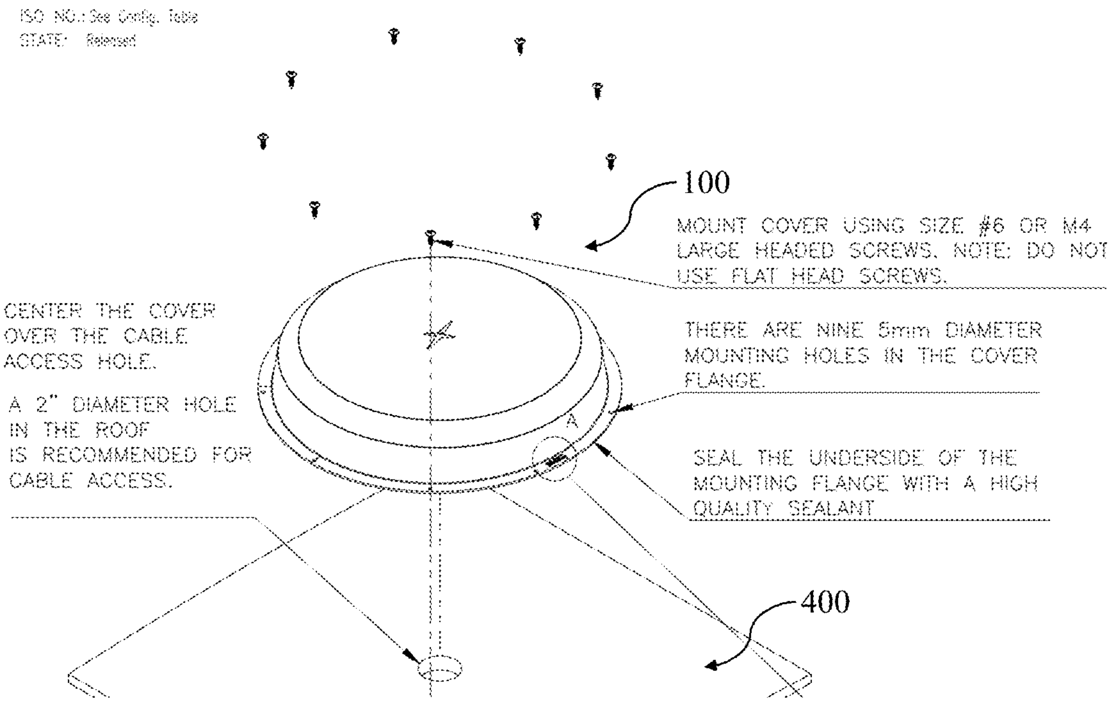
FIG. 4A is a perspective view illustrating the installation of the multi-antenna assembly of FIG. 1A, in accordance with the principles of the present disclosure.
Figure 4B:
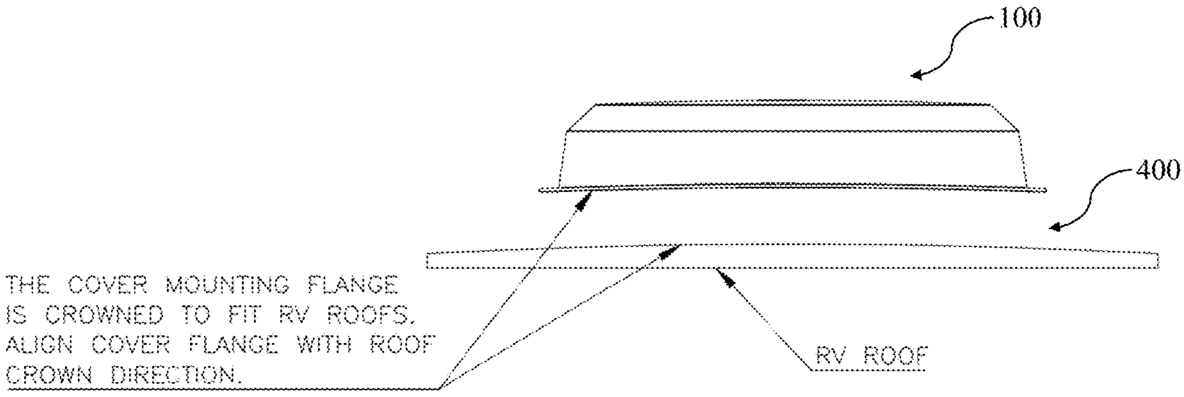
FIG. 4B is a front elevation view illustrating the installation of the multi-antenna assembly of FIG. 1A, in accordance with the principles of the present disclosure.

Referring now to FIGS. 4A and 4B, a methodology for installing the multi-antenna assembly 100 to, for example, an RV 400 is shown and described in detail. Specifically, the coaxial cables 500 are centered over a hole located on the RV 400. The coaxial cables 500 are then fed through this hole. A sealant is applied to the underside of the multi-antenna assembly 100 and the multi-antenna assembly 100 is secured to the RV 400 via a plurality of screws positioned around the perimeter of the multi-antenna assembly 100. In some implementations, and as discussed supra, the underside of the multi-antenna assembly 100 may be crowned on the underside of the multi-antenna assembly 100 to enable the multi-antenna assembly 100 to be secured to curved surfaces.

It will be recognized that while certain aspects of the present disclosure are described in terms of specific design examples, these descriptions are only illustrative of the broader methods of the disclosure and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

The invention claimed is:

1. A multi-antenna assembly comprising:

a plurality of ultra-high frequency (UHF) antenna elements and a wire loop antenna element that are each coupled to a multi-antenna printed circuit board (PCB), portions of the plurality of UHF antenna elements and a portion of the wire loop antenna element being arranged coplanar with one another; and a plurality of cellular antenna elements and one or more Wi-Fi antenna elements disposed on the multi-antenna PCB, a radiating portion of the plurality of cellular antenna elements and the one or more Wi-Fi antenna elements being arranged parallel and offset with the plurality of UHF antenna elements and the wire loop antenna element;

wherein a portion of the plurality of cellular antenna elements and a portion of the one or more Wi-Fi antenna elements are arranged on the multi-antenna PCB such that they do not overlap with feed portions of the plurality of UHF antenna elements.

2. The multi-antenna assembly of claim 1, wherein each of the plurality of UHF antenna elements comprise dipole antenna elements.

3. The multi-antenna assembly of claim 2, wherein the plurality of UHF antenna elements collectively comprises a circular array of dipole antenna elements.

4. The multi-antenna assembly of claim 3, wherein each of the plurality of UHF antenna elements comprises a stamped metal element.

5. The multi-antenna assembly of claim 4, wherein each of the plurality of UHF antenna elements are heat-staked to a polymer housing.

6. The multi-antenna assembly of claim 1, wherein the feed portions of the plurality of UHF antenna elements and ends of the wire loop antenna element are received within the multi-antenna PCB.

7. The multi-antenna assembly of claim 6, wherein the multi-antenna PCB comprises a generally hexagonal ground plane.

8. The multi-antenna assembly of claim 7, wherein each side of the generally hexagonal ground plane has a cellular antenna element of the plurality of cellular antenna elements or one of the one or more Wi-Fi antenna elements associated with a respective side of the generally hexagonal ground plane.

9. The multi-antenna assembly of claim 8, wherein the feed portions of the plurality of UHF antenna elements only pass over half of the plurality of cellular antenna elements.

10. The multi-antenna assembly of claim 9, wherein the feed portions of the plurality of UHF antenna elements only pass over half of the one or more Wi-Fi antenna elements.

11. The multi-antenna assembly of claim 10, wherein the generally hexagonal ground plane further comprises a global navigation satellite system (GNSS) antenna element.

12. The multi-antenna assembly of claim 1, further comprising a polymer housing comprising a mounting surface;

wherein the plurality of UHF antenna elements, the wire loop antenna element and the multi-antenna PCB are each positioned in a top half of the polymer housing that is disposed furthest away from the mounting surface of the housing.

13. The multi-antenna assembly of claim 12, wherein the mounting surface of the housing comprises a curved surface.

14. The multi-antenna assembly of claim 12, wherein the polymer housing further comprises a plurality of bosses, the plurality of bosses being configured to collectively support the plurality of UHF antenna elements, the wire loop antenna element and the multi-antenna PCB.

15. The multi-antenna assembly of claim 14, wherein each of the plurality of UHF antenna elements are heat-staked to the polymer housing.

16. The multi-antenna assembly of claim 12, wherein the plurality of cellular antenna elements and the one or more Wi-Fi antenna elements each comprise an inverted-F antenna (IFA) element.

17. The multi-antenna assembly of claim 12, wherein the multi-antenna PCB comprises a generally hexagonal ground plane.

18. The multi-antenna assembly of claim 17, wherein each side of the generally hexagonal ground plane has a cellular antenna element of the plurality of cellular antenna elements or one of the one or more Wi-Fi antenna elements associated with a respective side of the generally hexagonal ground plane.

19. The multi-antenna assembly of claim 18, wherein the feed portions of the plurality of UHF antenna elements only pass over half of the plurality of cellular antenna elements.

20. The multi-antenna assembly of claim 19, wherein the feed portions of the plurality of UHF antenna elements only pass over half of the one or more Wi-Fi antenna elements.

* * * * *